United States Patent
Hsu

(10) Patent No.: US 8,944,323 B2
(45) Date of Patent: Feb. 3, 2015

(54) SHOPPING SYSTEM AND METHOD

(71) Applicant: Hon Hai Precision Industry Co., Ltd., New Taipei (TW)

(72) Inventor: Cheng-Ta Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 97 days.

(21) Appl. No.: 13/726,613

(22) Filed: Dec. 26, 2012

(65) Prior Publication Data

US 2013/0334299 A1 Dec. 19, 2013

(30) Foreign Application Priority Data

Jun. 13, 2012 (TW) .............................. 101121186 A

(51) Int. Cl.
*G06K 15/00* (2006.01)
*G06F 17/30* (2006.01)
*G06Q 30/06* (2012.01)

(52) U.S. Cl.
CPC ...... *G06F 17/30241* (2013.01); *G06Q 30/0639* (2013.01)

USPC .......................................................... 235/383

(58) Field of Classification Search
CPC .......... G06Q 30/0267; G06Q 30/0641; G06Q 30/0261; G06Q 30/0639
USPC .......................................................... 235/383
See application file for complete search history.

(56) References Cited

U.S. PATENT DOCUMENTS 7,848,962 B2 * 12/2010 Fuzell-Casey et al. ...... 705/26.9

* cited by examiner

*Primary Examiner* — Jamara Franklin
(74) *Attorney, Agent, or Firm* — Novak Druce Connolly Bove + Quigg LLP

(57) ABSTRACT

A method for locating an item using a cloud server of a data center and an electronic device. The cloud server receives a barcode corresponding to a product from the electronic device and searches a location of the product in a shopping mall. The cloud server calculates a route from a location of the electronic device to the location of the product and shows the route on an electronic map of the shopping mall. The cloud server sends the electronic map with the route to the electronic device.

15 Claims, 4 Drawing Sheets

SHOPPING SYSTEM AND METHOD

BACKGROUND

1. Technical Field

The embodiments of the present disclosure relate to cloud computing technology, and particularly to a shopping system and method for shopping via cloud computing.

2. Description of Related Art

A shopping mall is a huge place for shopping and includes a plurality of products. However, if a customer wants to buy a product, he/she may takes much time to search where the product is located in the shopping mall, which is time-consuming. Thus, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
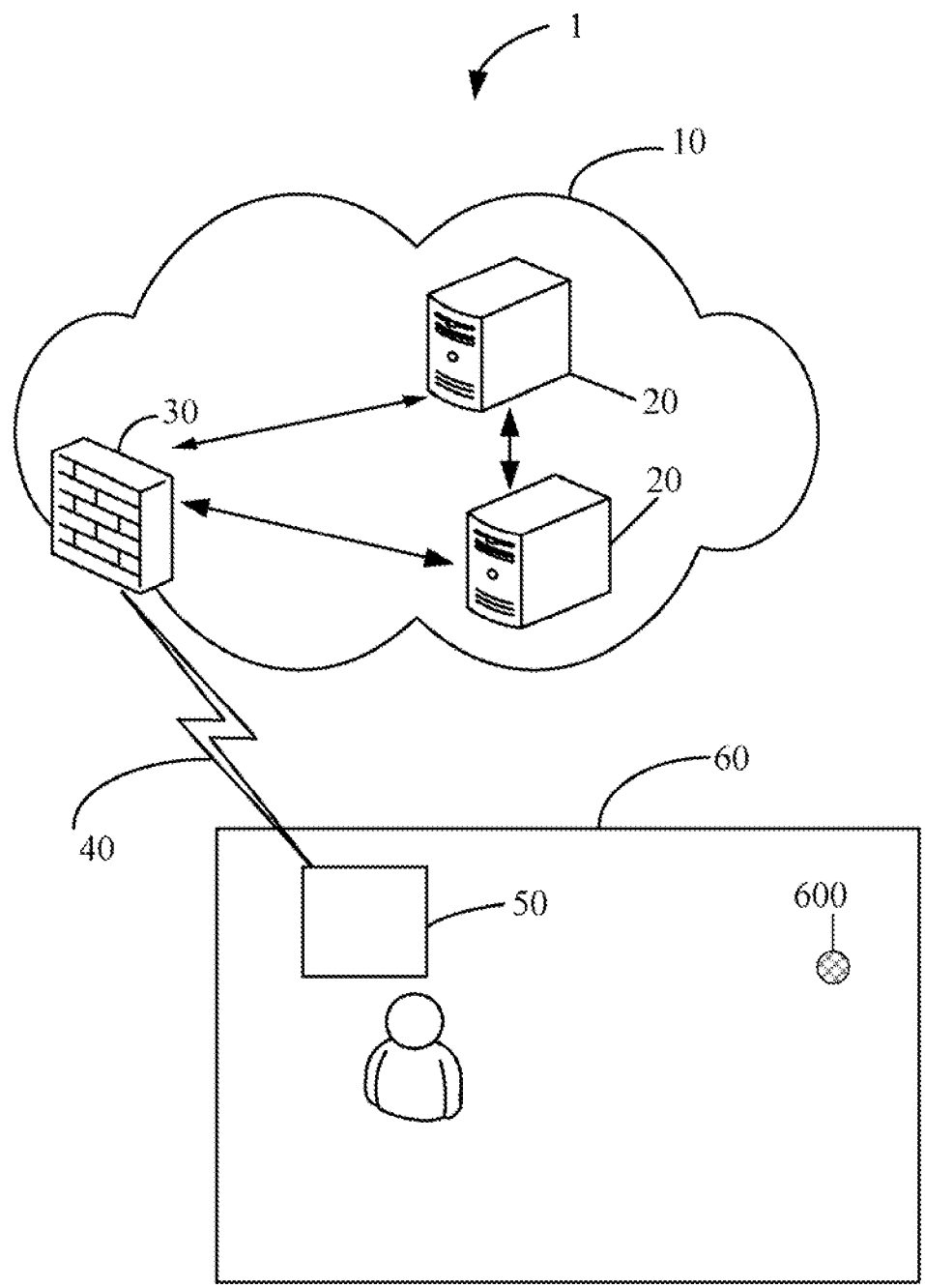
FIG. 1 is a system view of one embodiment of a shopping system.

FIG. 1 is a block diagram of one embodiment of a shopping system 1. In one embodiment, the shopping system 1 may include a data center 10, a network 40 and one or more electronic devices 50. The shopping system 1 directs a customer to a location of a product 600 that the customer wants to buy in a shopping mall 60.

The data center 10 is located behind a firewall 30 and connected to the network 40. The network 40 may be, but is not limited to, a wide area network (e.g., the Internet) or a local area network. The firewall 30 protects the data center 10 from unauthorized accesses and secures the information of the data center 10. The data center 10 is designed for cloud computing capability and capacity and includes a plurality of cloud servers 20. The cloud servers 20 are connected to the one or more electronic devices 50 using a wireless connection. The wireless connection may be, but is not limited to, a BLUETOOTH connection, a WIFI connection, a local area network, a global system for mobile communication (GSM) network, or a code division multiple access (CDMA) for mobile communication network.

Each cloud server 20 is a dynamic host configuration protocol (DHCP) server, which provides a DHCP service. In one embodiment, the cloud server 20 assigns IP addresses to the electronic device 50 by the DHCP service. In one embodiment, the cloud server 20 uses dynamic allocation to assign the IP addresses to the electronic devices 50. The cloud server 20 further sets a password (e.g., 12345678$) and a name (e.g., mary) for enabling the electronic device 50 to access the data center 10. The cloud server 20 also provides an access privilege for each electronic device 50 according to the assigned IP address and the name. Additionally, the cloud server 20 may be a personal computer (PC), a network server, or any item of other data-processing equipment. Further details of the cloud server 20 will be described below.

The electronic device 50 is connected to the network 40. Additionally, the electronic device 50 provides a customer interface on a display device (not shown) of the electronic device 50 for a customer to access the data center 10 to do one or more operations of the cloud server 20. For example, the customer may input a password and name by an input device (e.g., keyboard) into the customer interface on the display device of the electronic device 50 to access the data center 10. The electronic device 50 includes a global position system (GPS) services, the GPS services provide a location service. For example, the GPS services in real-time obtains coordinates of a location of the electronic device 50. The electronic device 50 may be a mobile phone, a personal digital assistant (PDA), a handheld game player, a digital camera, a tablet computer, or any other portable electronic device.

Figure 2:
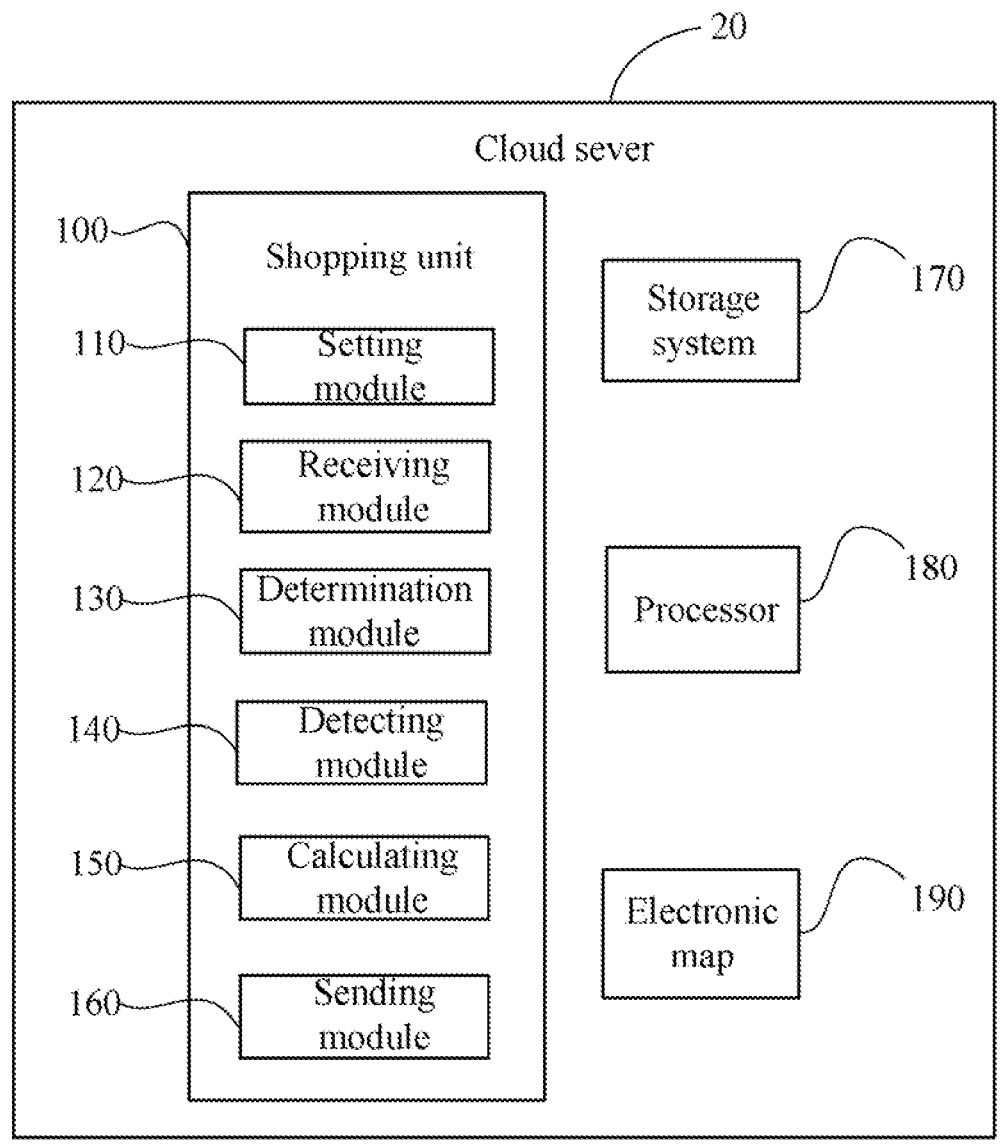
FIG. 2 is a block diagram of one embodiment of a cloud server included in FIG. 1.

FIG. 2 is a block diagram of one embodiment of the cloud server 20. The cloud server 20 includes a shopping unit 100. In one embodiment, the cloud server 20 includes a storage system 170 and at least one processor 180. In one embodiment, the shopping unit 100 includes a setting module 110, a receiving module 120, a determination module 130, a detecting module 140, a calculating module 150, and a sending module 160. The modules 110-160 may include computerized code in the form of one or more programs that are stored in the storage system 170. The computerized code includes instructions that are executed by the at least one processor 180 to provide functions for the modules 110-160. The storage system 170 may be a memory, such as an EPROM, hard drive disk (HDD), or flash memory. The storage system 170 further stores an electronic map 190 of the shopping mall 60.

The setting module 110 sets identification information for accessing the cloud server 20 of the data center 10 and assigns the identification information to the electronic device 50. In one embodiment, the identification information includes the name, the password, and the IP address of the electronic device 50. The identification information of each electronic device 50 is also stored in the storage system 170.

The receiving module 120 receives a login request to access the cloud server 20 of the data center 10 from the electronic device 50. In one embodiment, the customer inputs a name and a password in the customer interface provided by the electronic device 50. The electronic device 50 generates the login request and sends the login request to the cloud server 20 of the data center 10. It is understood that the login request is defined as a command having information of the input name, input password and the IP address of the electronic device 50. With DHCP the device 50 may at different time be allocated different IP addresses.

The determination module 130 determines if the electronic device 50 is permitted to access the cloud server 20 of the data center 10. In one embodiment, the determination module 130 compares the identification information of the electronic device 50 that is stored in the storage system 170 with information contained in the login request, if the identification information is the same as the information contained in the login request, the electronic device 50 is permitted to access the cloud server 20 of the data center 10. Otherwise, if the identification information is different from the information contained in the login request, the electronic device 50 is not permitted to access the cloud server 20 of the data center 10.

The receiving module 130 further receives a barcode corresponding to a product 600 from the electronic device 50 and searches a location of the product 600 in a shopping mall 60. In one embodiment, the barcode includes a name of the product 600, a serial number of the product 600, a type of the product 600, a price of the product 600, an image of the product 600, position information of the product 600 located at the shopping mall. The barcode is provided by the shopping mall 60 and shown in an official website of the shopping mall 60. A customer uses the electronic device 50 to download the barcode corresponding to the product 600 from official website of the shopping mall 60 and sends the barcode corresponding to the product 600 to the cloud server 20. The barcode may be, but is not limited to, a one-dimensional barcode (e.g., EAN, UPC, ITF25, codebar, code93, code128) or a two-dimensional barcode (e.g., PDF417, code49, code 16k, data maxicode).

The detecting module 140 detects coordinates of the location of the electronic device 50. In one embodiment, the GPS services in real-time obtain coordinates of a location of the electronic device 50 and sends the coordinates of a location of the electronic device 50 to the cloud server 20.

Figure 4:
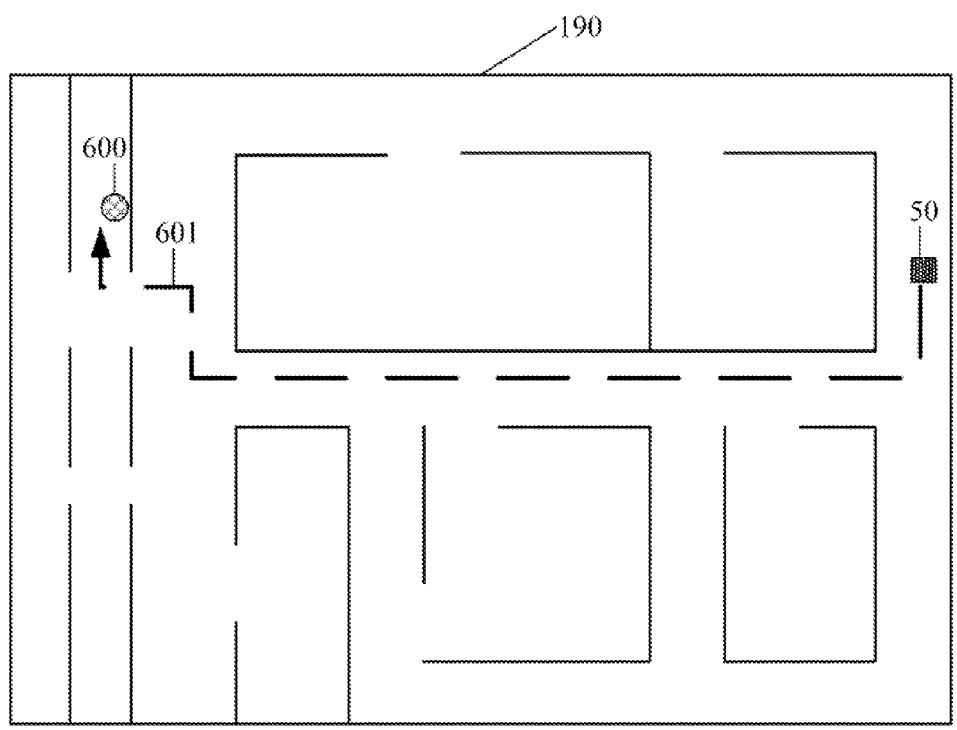
FIG. 4 illustrates a route from a location of an electronic device to the location of a product in a shopping mall.

The calculating module 150 calculates a route 601 from the location of the electronic device 50 to the location of the product 600 and show the electronic map with the route 190 of the shopping mall 60 (as shown in FIG. 4). In one embodiment, the calculating module 150 calculates the route 601 by the coordinates of the location of the electronic device and the coordinates of the location of the product 600. As shown in FIG. 4, the route 601 is calculated and shown in the electronic map 190 of the shopping mall 60.

The sending module 160 sends the image of the product 600 and the electronic map 190 with the route 601 to the electronic device 50. The customer may easily go to the location of the product 600 by following the route 601 on the electronic map 190.

The determination module 130 further denies the electronic device 50 to access the cloud server 20 of the data center 10, in response to a determination that the electronic device 50 is not permitted to access the cloud server 20 of the data center 10.

Figure 3:
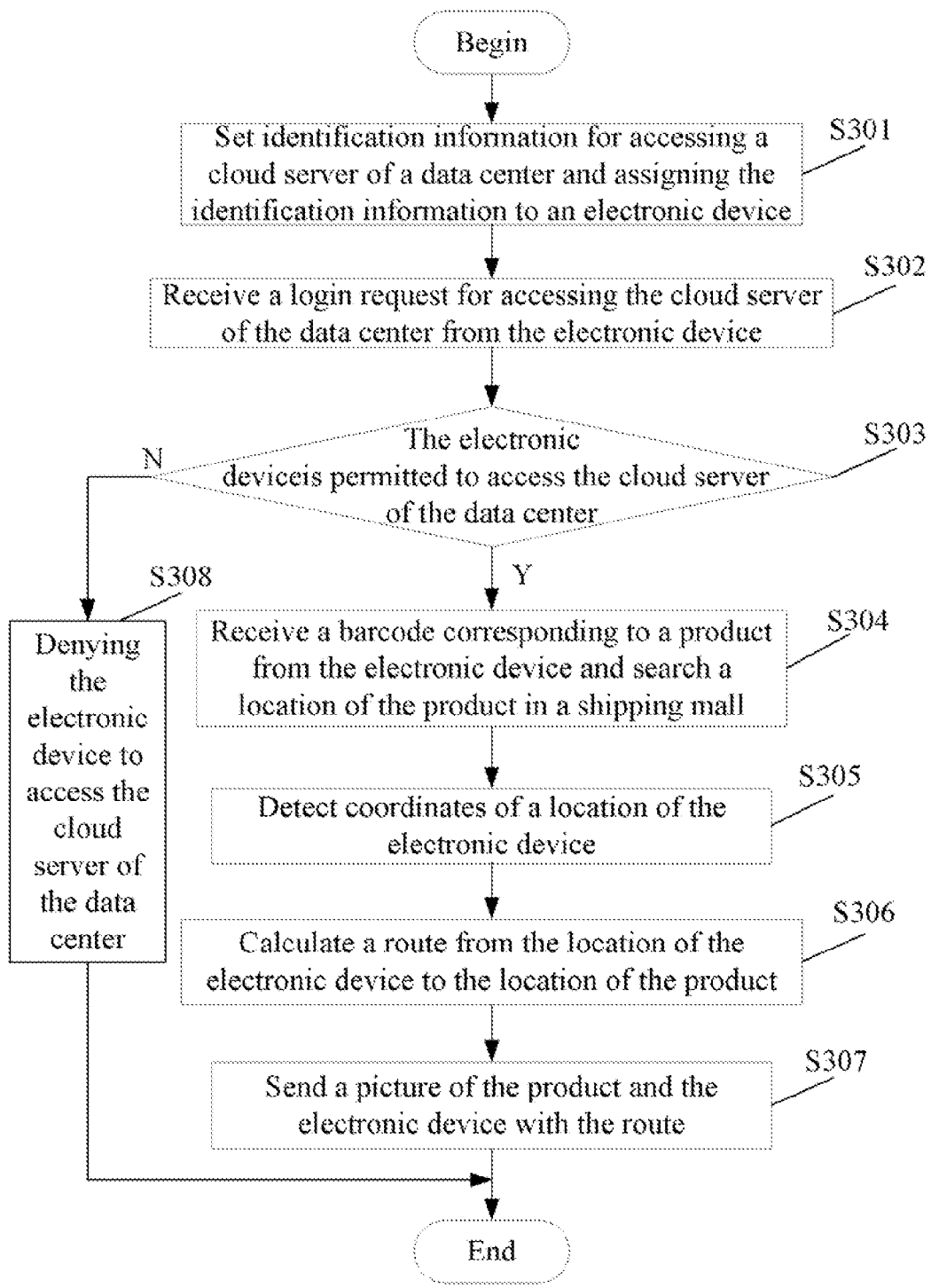
FIG. 3 is a flowchart of one embodiment of a shopping method.

FIG. 3 is a flowchart of one embodiment of a shopping method. Depending on the embodiment, additional steps may be added, others deleted, and the ordering of the blocks may be changed.

In step S301, the setting module 110 sets identification information for accessing the cloud server 20 of the data center 10 and assigns the identification information to the electronic device 50. As mentioned above, the identification information includes the name, the password, and the IP address of the electronic device 50.

In step S302, the receiving module 120 receives a login request to access the cloud server 20 of the data center 10 from the electronic device 50. In one embodiment, the customer inputs a name "mary" and a password "12345678$" in the customer interface of the electronic device 50.

In step S303, the determination module 130 determines if the electronic device 50 is permitted to access the cloud server 20 of the data center 10. In one embodiment, if the identification information matches the information contained in the login request, the electronic device 50 is permitted to access the cloud server 20 of the data center 10, the procedure goes to step S304. Otherwise, if the identification information is different from the information contained in the login request, the electronic device 50 is not permitted to access the cloud server 20 of the data center 10, the procedure goes to step S308.

In step S304, the receiving module 130 further receives a barcode corresponding to a product 600 from the electronic device 50 and searches a location of the product 600 in a shopping mall 60. In one embodiment, the shopping mall 60 may also provide an application which includes a plurality of barcodes for the prospective customer. The customer downloads the application from an application store and chooses the barcode from the application, then sends the barcode to the cloud server 60.

In step S305, the detecting module 140 detects coordinates of a location of the electronic device 50. In one embodiment, the detecting module 140 sends a command to starts the GPS services of the electronic device 50, and receives the coordinates of a location of the electronic device 50 from the GPS services of the electronic device 50.

In step S306, the calculating module 150 calculates a route 601 from the location of the electronic device to the location of the product 600 and shows the electronic map with the route 190 of the shopping mall 60. As shown in FIG. 4, the route is calculated and shown in the electronic map 190 of the shopping mall 60.

In step 307, the sending module 160 sends the image of the product and the electronic map 190 with the route 601 to the electronic device 50. The customer may easily go to the location of the product 600 by following the route 601 on the electronic map 190.

In step 308, the determination module 130 further denies the electronic device 50 to access the cloud server 20 of the data center 10. For example, if the name input by the customer is "hmary" and the password is "1234567$", the determination module 130 denies the electronic device 50 to access the cloud server 20 of the data center 10.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A cloud server of a data center, the cloud server in communication with an electronic device, comprising:
   a storage system storing an electronic map of a shopping mall;
   at least one processor; and
   one or more programs stored in the storage system and being executable by the at least one processor, the one or more programs comprising:
   a receiving module that receives a barcode corresponding to a product from the electronic device and searches a location of the product in the shopping mall, wherein the barcode is provided by the shopping mall and is shown in an official website of the shopping mall, and the electronic device downloading the barcode corresponds to the product from official website of the shopping mall;
   a detecting module that detects coordinates of a location of the electronic device;
   a calculating module that calculates a route from the location of the electronic device to the location of the product and shows the electronic map with the route of the shopping mall; and
   a sending module that sends the electronic map with the route to the electronic device.

2. The cloud server of the data center of claim 1, wherein the barcode comprises a name of the product, a serial number of the product, a type of the product, a price of the product, an image of the product, and position information of the product located at the shopping mall.

3. The cloud server of the data center of claim 1, wherein barcode is a one-dimensional barcode or a two-dimensional barcode.

4. The cloud server of the data center of claim 1, wherein the coordinates of the location of the electronic device is obtained by a global positioning system (GPS) services of the electronic device.

5. The cloud server of the data center of claim 1, wherein the electronic device is selected from the group consisting of a mobile phone, a personal digital assistant (PDA), a handheld game player, a digital camera, and a tablet computer.

6. A shopping method implemented by a cloud server of a data center, the cloud server in communication with an electronic device, the method comprising:
receiving a barcode corresponding to a product from the electronic device and searching a location of the product in an shopping mall, wherein the barcode is provided by the shopping mall and is shown in an official website of the shopping mall, and the electronic device downloading the barcode corresponds to the product from official website of the shopping mall;
detecting coordinates of a location of the electronic device;
calculating a route from the location of the electronic device to the location of the product and showing the route on an electronic map of the shopping mall; and
sending the electronic map with the route to the electronic device.

7. The method of claim 6, wherein the barcode comprises a name of the product, a serial number of the product, a type of the product, a price of the product, an image of the product, and position information of the product located at the shopping mall.

8. The method of claim 6, wherein the barcode is a one-dimensional barcode or a two-dimensional barcode.

9. The method of claim 6, wherein the coordinates of the location of the electronic device is obtained by a global positioning system (GPS) services of the electronic device.

10. The method of claim 6, wherein the electronic device is selected from the group consisting of a mobile phone, a personal digital assistant (PDA), a handheld game player, a digital camera, and a tablet computer.

11. A non-transitory computer-readable medium having stored thereon instructions that, when executed by a cloud server of a data center, the cloud server in communication with an electronic device, causing the cloud server to perform a shopping method, the method comprising:
receiving a barcode corresponding to a product from the electronic device and searching a location of the product in an shopping mall, wherein the barcode is provided by the shopping mall and is shown in an official website of the shopping mall, and the electronic device downloading the barcode corresponds to the product from official website of the shopping mall;
detecting coordinates of a location of the electronic device;
calculating a route from the location of the electronic device to the location of the product and showing the route on an electronic map of the shopping mall; and
sending the electronic map with the route to the electronic device.

12. The medium of claim 11, wherein the barcode comprises a name of the product, a serial number of the product, a type of the product, a price of the product, an image of the product, and position information of the product located at the shopping mall.

13. The medium of claim 11, wherein the barcode is a one-dimensional barcode or a two-dimensional barcode.

14. The medium of claim 11, wherein the coordinates of the location of the electronic device is obtained by a global positioning system (GPS) services of the electronic device.

15. The medium of claim 11, wherein the electronic device is selected from the group consisting of a mobile phone, a personal digital assistant (PDA), a handheld game player, a digital camera, and a tablet computer.

* * * * *